(No Model.)

L. M. BOWERS.
HORSE DETACHER.

No. 524,241. Patented Aug. 7, 1894.

WITNESSES:—
Horace G. Deitz
James K. Palk.

INVENTOR:—
LEWIS M. BOWERS.
BY HIS ATTORNEY
David A. Gourick

UNITED STATES PATENT OFFICE.

LEWIS M. BOWERS, OF HOPEWELL, PENNSYLVANIA, ASSIGNOR OF ONE-HALF TO HENRY C. REHMEYER, OF SAME PLACE, AND EDWARD E. ALLEN, OF SHREWSBURY, PENNSYLVANIA.

HORSE-DETACHER.

SPECIFICATION forming part of Letters Patent No. 524,241, dated August 7, 1894.

Application filed April 27, 1894. Serial No. 509,248. (No model.)

*To all whom it may concern:*

Be it known that I, LEWIS M. BOWERS, a citizen of the United States, residing in Hopewell township, in the county of York and State of Pennsylvania, have invented a new and useful Horse-Detacher, of which the following is a specification.

My invention relates to improvements in horse detachers, and has for its object to provide a new and improved device capable of attachment to any shaft, and adapted to be quickly and surely operated the instant the horse becomes unmanageable to detach him from the vehicle; and this I accomplish in the manner and by the means hereinafter described and claimed, reference being had to the accompanying drawings, in which—

Figure 1:
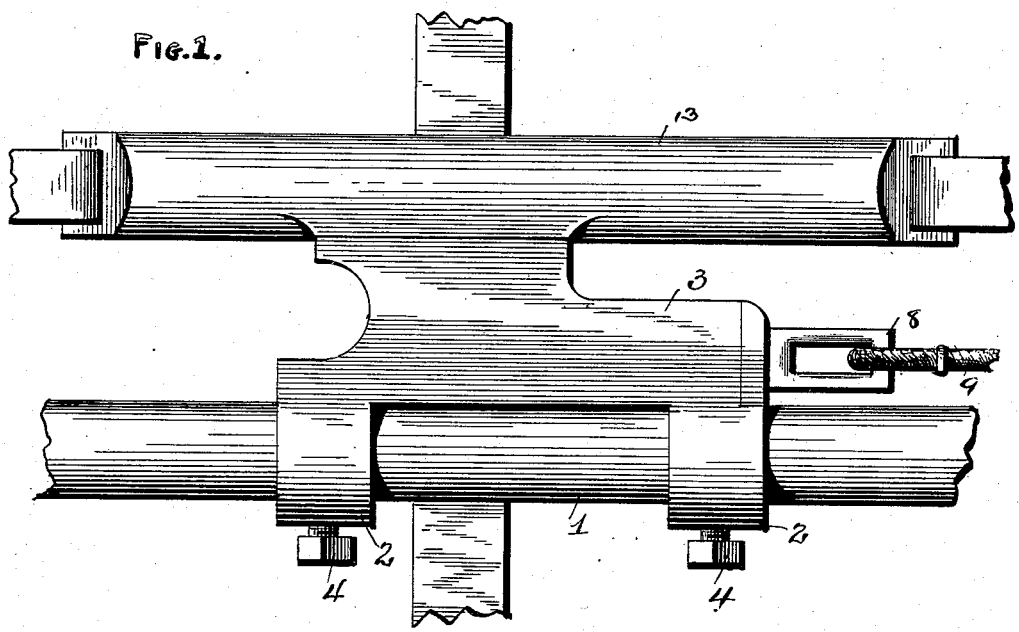
Figure 2:
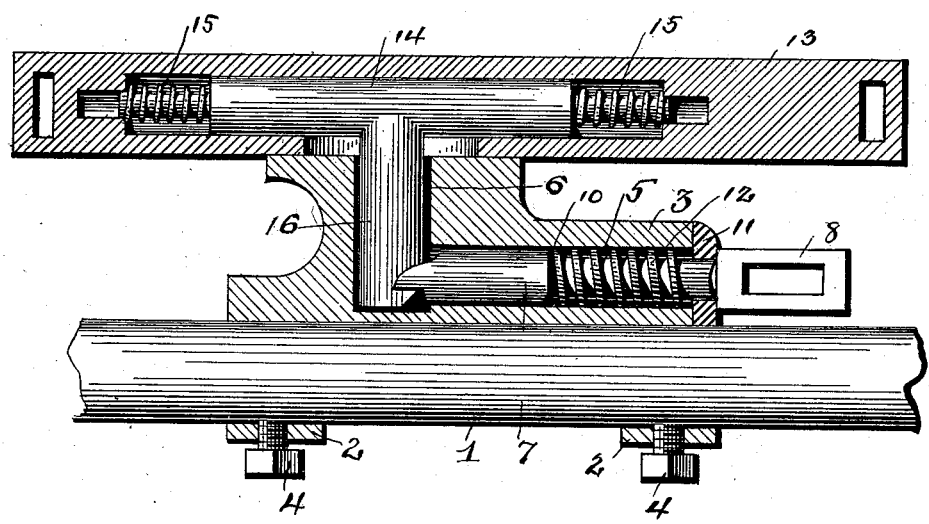

Figure 1 is a side elevation of a portion of a shaft showing my improved device attached thereto. Fig. 2 is a similar view showing the detaching mechanism partly in section.

In the said figures similar figures of reference indicate corresponding parts.

The numeral 1 denotes a portion of one of the shafts of a vehicle, preferably its front end, having attached thereto by means of the rings 2, the main portion 3 of the detacher. Set screws 4 serve to retain the main portion 3 fixed in any desired position on the shaft. The main portion 3 has an aperture 5 running longitudinally therethrough from the back end, but not through to the front end. Registering with this aperture is the vertical aperture 6. Freely movable in the aperture 5 is a pin 7, projecting from the rear of the aperture 5 and terminating in the ring 8 to which is attached a cord 9 for a purpose hereinafter to be described. Retained between a shoulder 10 on the pin and the removable end plate 11 is a spring 12 adapted to normally force the pin 7 forward into the vertical aperture 6.

Normally resting on top of the main portion 3 is the rod or bar 13 having loops in each end to receive the breast and breech straps of the harness. This bar 13 is hollow for a portion of its length to receive the rod 14 as shown. On each end of the rod 14 is a coil spring 15 to allow for longitudinal strain on the bar 13. Projecting downwardly from the rod 14, through a slot in the bar 13 and into the vertical aperture 6 is an arm 16, preferably formed integral with the rod 14. This arm forms the sole means of connection between the main portion 3 of the detacher and the bar 13.

The arm 16 is notched on its rear side near its lower end, to receive the front end of the pin 7, and it will readily be seen that when once engaged thereby the tension of the spring 12 will effectually prevent its withdrawal. The top of the pin 7 is rounded at its end to permit the insertion of the arm 16 against the tension of the spring 12.

The operation of my device is as follows:— The breast and breech straps of the harness are attached to the front and rear ends of the bar 13 and the arm 16 is forced into the vertical aperture 6 in the main portion 3 of the device until the pin 7 engages the notch in said arm. This effectually holds the parts together, while at the same time the pin 7 receives none of the draft strain of the vehicle. When the horse becomes refractory and it is desired to loosen him, it is only necessary for the driver to pull the cord 9 thus withdrawing the pin 7 from engagement with the notch in the arm 16, whereupon the shaft will fall from its own weight thus disconnecting the arm 16 from the main portion 3 and releasing the horse. It will of course be understood that the other shaft of the vehicle is provided with a similar device.

By employing the rod 14 in the bar 13 with the compensating springs 15, I am able to dispense with the ordinary singletree.

Having thus described my invention, what I claim as new, and desire to secure by Letters Patent, is—

1. In a horse detacher, the combination with the shaft, the main portion 3 attached thereto, and a spring pressed pin movable longitudinally in an aperture in said main portion, of the hollow bar to which the harness is attached carrying in it the bar 13 having draft equalizing springs 15 on its ends, and the projecting notched arm 16 engaging with the end of the pin in the main portion 3, substantially as shown and described.

2. In a horse detacher the combination with the shaft, of the main portion 3 removably secured thereto, the spring pressed pin 7 longitudinally movable in the said main portion, the hollow rod or bar 13 to which the harness is attached, the rod 14 moving in the bar 13 and having compensating springs 15 on its ends the notched arm 16 projecting from the rod 14 at right angles thereto and into the main portion 3 wherein it is normally retained by the pin 7, and the cord 9, for retracting the pin 7 and releasing the arm 16, substantially as set forth.

LEWIS M. BOWERS.

Witnesses:
N. J. ZEIGBE,
B. F. KOLLER.